Sept. 15, 1970  E. W. WALTER  3,528,151
RASP HEAD CONSTRUCTION

Filed Aug. 13, 1969  3 Sheets-Sheet 1

INVENTOR.
ERNEST W. WALTER
BY Bosworth, Sessions,
Herrstrom & Cain
ATTORNEY.

Sept. 15, 1970      E. W. WALTER      3,528,151
RASP HEAD CONSTRUCTION
Filed Aug. 13, 1969      3 Sheets-Sheet 2
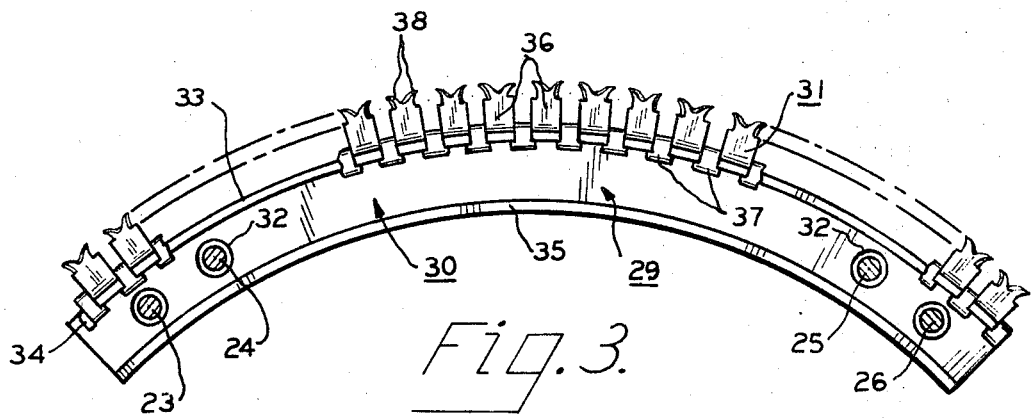
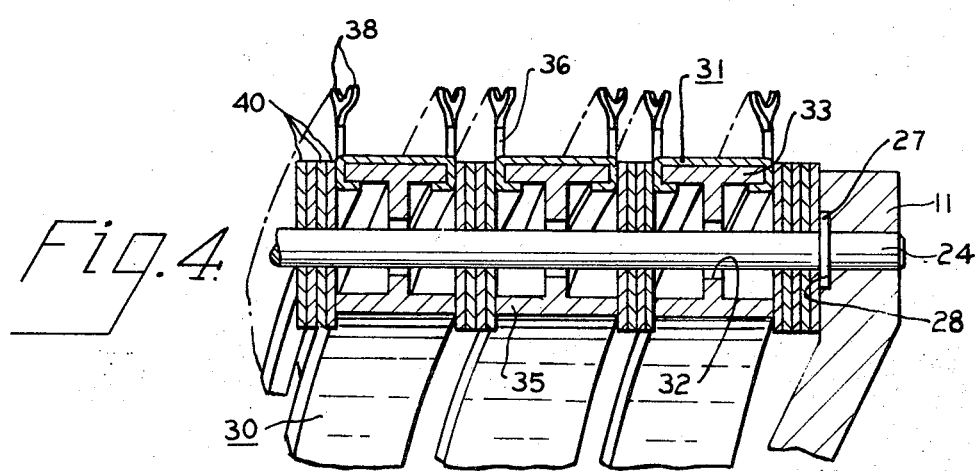
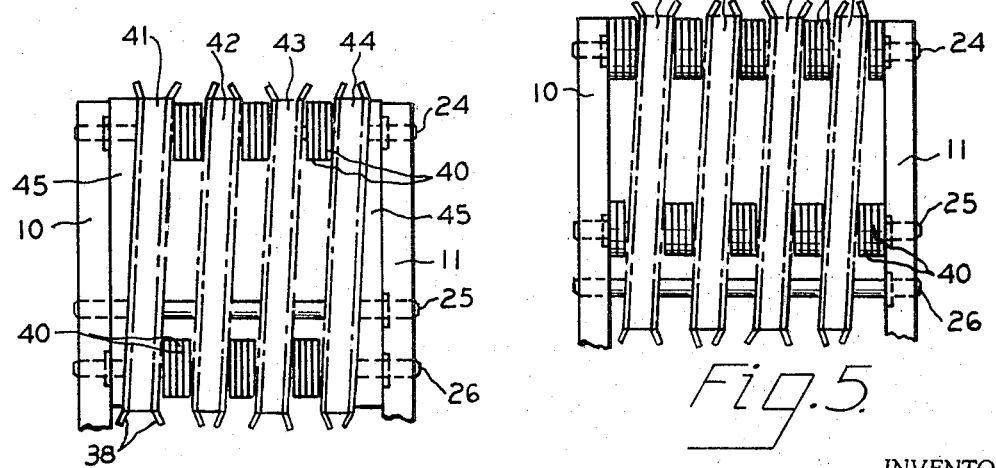
INVENTOR.
ERNEST W. WALTER
BY 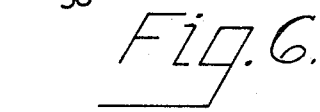
ATTORNEYS Sept. 15, 1970     E. W. WALTER     3,528,151

RASP HEAD CONSTRUCTION

Filed Aug. 13, 1969     3 Sheets-Sheet 3

INVENTOR.
ERNEST W. WALTER
BY
ATTORNEYS.

United States Patent Office 3,528,151
Patented Sept. 15, 1970

3,528,151
RASP HEAD CONSTRUCTION
Ernest W. Walter, P.O. Box 2119, 2411 Cypress Gardens Road, Winter Haven, Fla. 33880
Filed Aug. 13, 1969, Ser. No. 849,783
Int. Cl. B23d 71/00; B27i 1/00
U.S. Cl. 29—78                 16 Claims

ABSTRACT OF THE DISCLOSURE

An improved rasp head is provided especially adapted for removing rubber from a carcass of a tire prior to retreading, recapping, or the like. Among the advantages afforded by the present construction are: easy and quick assembly and disassembly of the component parts; flexible mounting of the cutting teeth, so that they may flexibly assume an outward position under the influence of centrifugal force and can deflect inwardly and/or laterally to minimize breakage of the teeth; adjustable spacing between blades of cutting teeth to vary the distance between the blades and/or the angular pitch or rake of the teeth with respect to a direction of movement; and a self-induced purge of ambient air through the head to cool the cutting teeth.

In a preferred embodiment, the cutting teeth take the form of a warp-resistant, integral, dual-bladed unit of U-shaped cross-section in which each leg of the U-shape terminates in cutting teeth. The dual-bladed unit may be detachably mounted with respect to the rasp head or the like.

CROSS REFERENCE TO RELATED APPLICATION

The dual-bladed unit herein described is disclosed and claimed alone and in combination with a mounting member in a copending application entitled, "Rasp Blade Construction," filed on Aug. 13, 1969 in the name of Ernest W. Walter and assigned Ser. No. 849,782.

BACKGROUND OF THE INVENTION

The present invention relates to a rasp blade particularly useful in buffing or abrading a rubber tire in order to prepare the carcass of the tire for recapping, retreading, or the like.

The useful life of a rubber tire can be lengthened by applying as by vulcanization a new rubber wear surface over the carcass after the original tread has become worn. Prior to such recapping or retreading as it is termed, it is necessary to remove the worn residual rubber essentially down to the fiber body of the tire in order to prepare a fresh, uniformly contoured surface to which the recap or retread will suitably adhere. This is accomplished by thrusting the peripheral surface of the tire against a revolving rasp head having cutting teeth which loosen, tear, and grind away the excess worn rubber on the tire and also roughen the resulting surface so as securely to bind the after-applied rubber in a recapping operation.

In general, cutting teeth do not have a very long useful life when used to abrade tires. Under even normal use, prior teeth soon become dull and cause a tire to smoke. As a result, it is frequently necessary to change the blades in a rasp head which is tedious and time-consuming.

Another factor which requires early shut-down and disassembly of a rasp head to replace its blades is actual breakage of the cutting teeth. Often this is caused by the relatively thin teeth, which may be only 0.025 to 0.050 inch in thickness, striking at high speeds against a hard object embedded in a tire, such as parts of nails, stones, etc. At such time, the mechanical shock on the blade can cause the extended cutting teeth to break.

Different sizes of tires or different kinds of tires require different buffing operations, that is, a deeper cut or more severe abrasion in some instances than in others. For example, a small tire requires a relatively shallow cut and relatively fine-textured surface buff; while larger tires, such as truck or tractor tires, necessitate a more rigorous, unsparing treatment, especially if the worn rubber is to be removed within a reasonable time. Rasp heads presently available are suited for only one predetermined type of cut or buff. Different types of teeth are installed in a rasp head depending on the severity of buff desired. It would therefore advance the art if a given installation of cutting teeth could be so adjustably carried in a rasp head as to provide a variable scope in the degree or severity of a buffing operation for the same teeth.

During the buffing or abrading operation, substantial frictional heat is generated. The surface temperature of a tire, for example, may rise to about 180° F. or higher. Such elevated temperatures adversely affect both the tire and the rasp blade. The excessive heat can soften the rubber of the tire and produce glazing. Rather than preparing the tire for suitable recapping or retreading, an abrading operation that glazes a tire inhibits an acceptable adherence of the abraded carcass to the recapping rubber.

The rasp blade itself is also seriously affected by excessive heat. Normally, such blades are heat-treated prior to use, and heat from buffing tempers the blade so that its hardness is diminished. The teeth of the blade become more susceptible to breakage and wear much more quickly, become dull, and cause the tire to smoke. Since rasp blades are usually thrown away after a wear of only about 0.025 inch from the tip of their teeth, accelerated wear due to heat becomes an expensive item. Still further, heat treating tends to warp the rasp blades. Not only does this affect the order of the cutting teeth, but as a result it is also difficult to mount a requisite number of blades side-by-side as in a rasp head.

It would therefore advance the art if a rasp head were available which inherently operated at a relatively low temperature so as to avoid glazing of the tire and to provide a longer, useful life substantially free of warpage.

SUMMARY OF THE INVENTION

A rasp head of the present invention is economical to manufacture and may be easily and simply assembled and disassembled. In one form, for example, the head comprises spaced apart side plates having interconnecting pins on which cutting blades are mounted. Moreover, this mounting is not rigid but permits the cutting blades to move, within limits, outwardly and even laterally to avoid shock and resultant breakage of teeth upon striking a hard object.

In addition, blades of cutting teeth in the present rasp head are adjustably mounted with respect to each other. This enables the distance between juxtaposed cutting blades of teeth to vary to meet diverse requirements, and/or the angle or rake of the cutting blades with respect to their direction of movement can be adjusted. Either type of adjustment affects the degree or severity of buffing operation afforded by the same blades.

In a preferred form, a rasp blade of the present head is made as an integral, U-shaped, double-bladed unit. The connecting bridge or bight section of the U-shape makes the unit considerably more resistant to warpage than a single blade having a simple one-plane configuration. Preferably, the double or dual bladed unit is slidably carried on a mounting member from which the unit can be easily and readily removed. The mounting member, in turn, is secured with other like members and units in a rasp head.

Additionally, in other embodiments, the sides of the rasp head may have openings provided with scoops, for example, which during rotation of the head force ambient air into the rasp head and around the cutting blades to cool all components.

BRIEF DESCRIPTION OF THE DRAWINGS

The accompanying drawings illustrate a presently preferred embodiment wherein:

FIG. 3 is a side elevation of a mounting bar and a dual-bladed unit which may be used with the rasp head;

FIG. 4 is a fragmentary, radial section of the rasp head of FIG. 1 and shows several of the units of FIG. 3 mounted side-by-side in the head;

FIG. 5 is a side elevation of a quadrant of the rasp head of FIG. 1 and illustrates the use of washers throughout the width of the quadrant for purposes of spacing blade units;

FIG. 6 is a side elevation of a quadrant of the rasp head and shows the use of side wedge plates with washers between blade units on different pins for adjusting the positions of the units;

DESCRIPTION OF THE PREFERRED EMBODIMENTS

Figure 1:
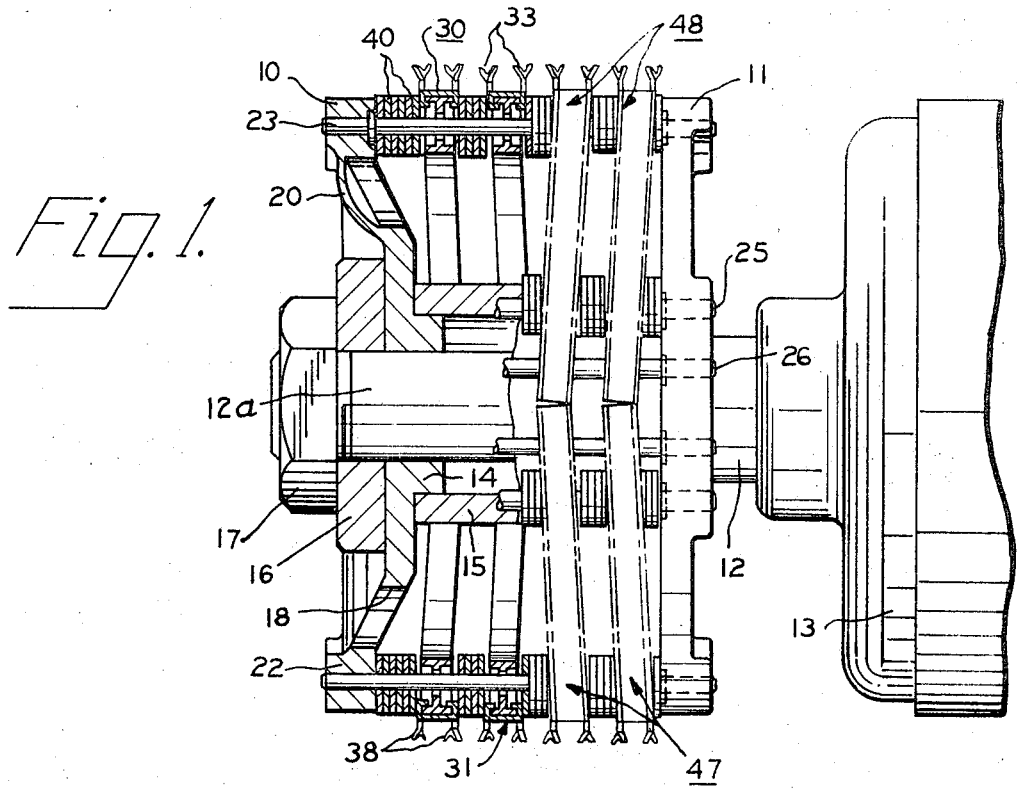
FIG. 1 is a side elevation, partially in section, of one form of the present rasp head, the section portion being taken on the off-set line 1—1 of FIG. 2.

In general, the present invention contemplates an improved rasp head construction, a limited flexible mounting of cutting blades of teeth peripherally arranged on the head, adjustable spacing of the same blades in the head, and self-induced cooling.

Referring initially to FIGS. 1 through 4, the rasp head illustrated comprises a pair of spaced-apart side plates 10 and 11 mounted on an arbor or shaft 12 of a conventional electric motor 13. The side plates may be molded from conventional plastics, preferably thermoset plastic reinforced with glass fibers, or cast from metals such as aluminum, or fabricated from still other metals such as cold rolled steel. Each side plate is generally dish-shaped and has an inwardly turned annulus 14. A collar 15 seats in a shoulder formed by each annulus 14 with its plate and thereby spaces apart the plates 10 and 11. The rasp head is secured to the arbor 12 to rotate with it. For example, the arbor has a reduced portion 12a to form a shoulder (not shown) and is threaded at its free end. Plate 11 bears against the shoulder on the arbor, while a bearing plate 16 and lock nut 17, which engages the threaded arbor end, force the described parts to the right as viewed in FIG. 1 for common rotation with the arbor 12.

Figure 2:
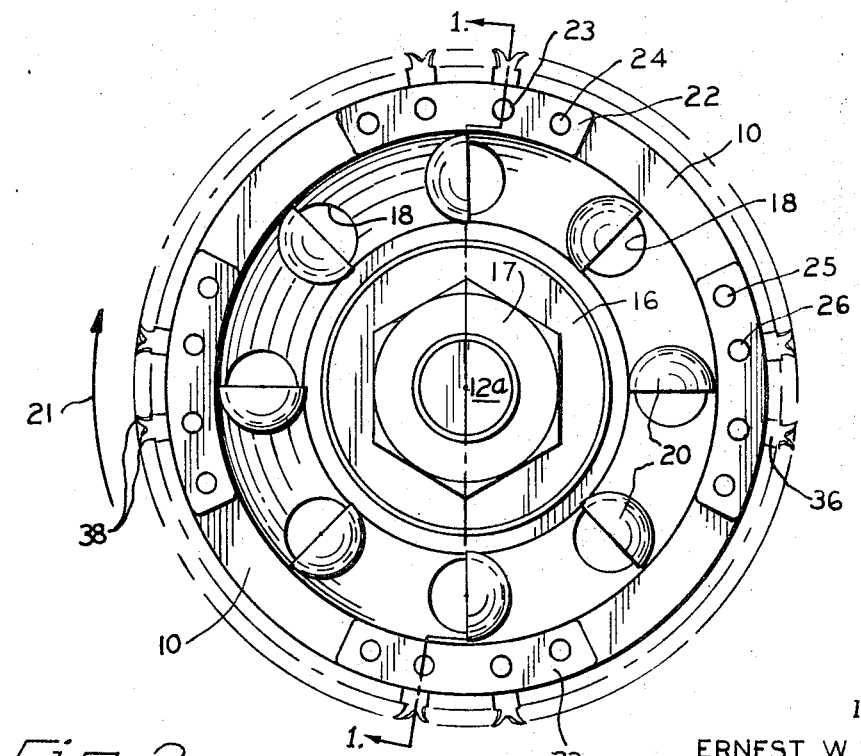
FIG. 2 is a left hand view of the rasp head of FIG. 1.

Each side plate has openings 18, eight being shown in the embodiment of FIG. 2. These openings are provided with side scoops 20 molded integrally with the plate. The scoops of both plates 10 and 11 are preferably disposed on corresponding sides of the openings 18, so that during rotation of the head, as in the direction of the arrow 21 of FIG. 2, the scoops act in unison to catch and direct ambient air through the openings 18 and outwardly radially of the head around the blades, hereinafter described. Each side plate also has four uniformly-spaced, slightly enlarged boss sections 22 along its outer edge. The blades of cutting teeth and their mountings bridge across plates 10 and 11 and are carried at the boss sections 22. Each quadrant of the rasp head is of similar construction and therefore only one quadrant is described in detail. Arbitrarily selecting the upper right hand quadrant of FIG. 2 for purposes of illustration, four pins 23, 24, 25, and 26, extend from plate 10 to plate 11 through openings in the corresponding boss sections of the plates. Preferably, at least two pins, such as pins 24 and 25, are press-fitted at one end into a plate, while the other ends of those pins are freely received in openings in sections 22 of the other plate and held against axial movement by a snap ring 27 (FIG. 4) which sets in a circumferential groove in the pin. Where a snap ring 27 is used, a plate 10 or 11 is counterbored as at 28 to receive the ring. The remaining pins, such as pins 23 and 26, are freely received at each end by openings in the boss sections and may be held in place by snap rings 27 in the manner just described.

FIGS. 3 and 4 illustrates one manner of supporting mounting bars and blades of cutting teeth on the pins. In particular, one mounting unit, generally represented at 29, may be taken to comprise a bar or arm 30 of I-shape in cross-section and a rasp blade generally indicated at 31 slidably mounted on the bar. The bar 30 is arcuately shaped in the direction of its length to form a segment of an annulus matching in curvature that of the side plates 10 and 11. Each bar 30 has openings 32 for each of the four pins 23 through 26. The openings 32 are all oversized with respect to the diameter of the pins to enable limited outward movement of the mounting bars 30 with respect to the balance of the rasp head. Both sides of the ends of an upper flange 33 of a mounting arm are turned downwardly adjacent one end of the bar to form tabs 34 which limit the movement of a rasp blade 31 in that direction. A lower flange 35 of the bar has a width substantially equalling the width of the upper flange 33 plus side-overlapping portions of the blade 31 as illustrated best in FIG. 4. This enables a series of the mounting strips 30 and cutting blades 31 to be placed side-by-side on a rasp head without interference.

The rasp blade 31 is also curved in the direction of its length in matching curvature and length with that of the bar or mounting strip 30. Preferably, the blade 31 is U-shaped in cross-section (FIG. 4), each side or leg having substantially equi-spaced, upstanding projections, generally indicated at 36, and intervening tabs 37 arranged in alternate fashion. The tabs 37 point downwardly and around the upper flange 33 of a bar for sliding engagement therewith. Each projection 36 terminates in a pair of diverging, pointed teeth 38. However, it is understood that the particular shape of the cutting teeth does not form a part of the present invention, and they may comprise any known shape of teeth. Similarly, the teeth may be uniformly disposed or angled or staggered with respect to each other in any manner desired.

In fabricating a dual-blade unit, such as that illustrated in FIGS. 3 and 4, the bar 30 may be of cast aluminum, which has the advantage of being lightweight and reducing the cost. However, heavier metals such as cold rolled steel can be used if desired. The rasp blade 31 is so designed that it can be entirely punched from sheet metal, measuring for instance from about 0.025 to about 0.050 inch in thickness. The projections 36 and teeth 38 are then bent upwardly to define the U-shaped cross-section, while the tabs 37 are bent downwardly to form attaching means. In one embodiment, the bar 30 and rasp blade 31 were arcuately shaped to a radius of 4.5 inches. Preferably, the blades are heat treated before use. In assembling the rasp blade and mounting bar, the tabs 37 slidably embrace the upper flange 33 of a bar. Preferably, end tabs 34 are at the leading end of the mounting bar when it is on a rotatable rasp head, so that centrifugal force keeps the rasp blade 31 against the tabs 34 and in place over the bar 30. Yet, the bar can be easily detached from a rasp head and the rasp blade 31 removed from the bar when desired.

The present rasp head construction contemplates adjusting the position of the rasp blades, both as to the distance between adjacent blades and as to the angle or rake the longitudinal axes, of the blades make with respect to their direction of movement. For example, FIGS. 4 and 5 illustrate one manner of adjustably mounting blade units, such as the unit shown in FIG. 3. In this case, a number of washers 40 are mounted on two of the pins and between the mounting bars 30 themselves and between the plates 10 and 11 adjacent mounting bars. Any two of the four pins per quadrant can be used for the spacing washers 40, but normally the center two pins are used, that is, pins 24 and 25.

In FIG. 5, the washers 40 are arranged to space apart uniformly four blade units 41, 42, 43, and 44 (all of which may be similar to the unit illustrated in FIG. 3) and to cant or slant the units at the same angle or rake with respect to their direction of movement. More particularly, there are four washers 40 on each of pins 24 and 25 between each of units 41 and 42, units 42 and 43, and units 43 and 44. On pin 24 between side plate 10 and unit 41 there are likewise four washers; but between unit 43 and side plate 11 on pin 24 there are only two washers. In reverse fashion, on pin 25 between side plate 10 and unit 41 there are only two washers; but between unit 44 and side plate 11 there are four washers. This cooperative use of an adjustable number of washers presents in FIG. 5 an array of parallel mounting bars and blade units that are evenly spaced and uniformly angled to the right as there viewed.

By varying the number of washers between units or between units and the side plates, it will be apparent that a wide scope of dispositions of units with respect to themselves and the side plates are possible to meet diverse buffing requirements, all without actually changing the blades themselves. FIG. 6, for example, illustrates two modifications in mounting the bar and blade units, either of which may be used alone or in combination with the other. For one modification, the washers 40 are carried on the second and fourth pins of the quadrant, that is, pins 24 and 26. Or, the washers could be carried on the first and fourth pins, namely, pins 23 and 26. As another modification, the embodiment of FIG. 6 illustrates the use of gauge bars 45. When it has been determined that a definite angle or rake is always to be used, for example because of the type of tire to be buffed, gauge bars 45 are placed inwardly of each side plate 10 and 11. Each of the bars 45 has four oversized openings to pass the four pins, 23 through 26, and are oppositely but uniformly slanted on their facing sides in an amount equal to the desired rake angle. It is then a simple matter to abut a blade unit against either gauge bar and to use the same number of washers between adjacent blade units to insure that all of the units instantly have the same angular disposition sought.

Figure 7:
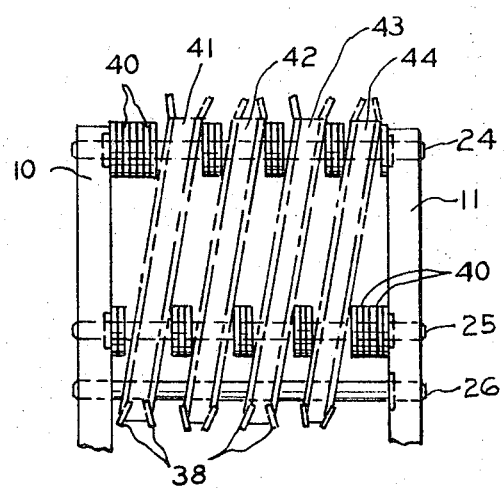
FIG. 7 is a side elevation of a quadrant similar to that of FIG. 5 and illustrates a re-positioning of some of the washers to effect an adjustment of the blade units.

The embodiment of FIG. 7 is similar to that of FIG. 5 and also illustrates two additional mounting modifications for the same set of blades, namely, increasing the angle of rake and introducing a limited amount of later movement or "play" for the blade units. In this case, pins 24 and 25 may still carry the washers 40, but the total number of washers in certain segregated spacings as well as the total number of washers for each pin are different. For example, in the embodiment of FIG. 5, pin 24 carries four washers between side plate 10 and unit 41, four washers between each of the units 41 through 44, and two washers between unit 44 and side plate 11 for a total of 18 washers. In contrast in FIG. 7, pin 24 carries seven washers between side plate 10 and unit 41, three washers between each of the units 41 through 43, and one washer between unit 43 and side plate 11 for a total of 17 washers. In a like manner, pin 25 in FIG. 5 carries groupings of two, four, four, four, and four washers, reading from left to right as they are viewed, for a total of 18 washers. In FIG. 7, however, pin 25 carries groupings of two, three, three, three, and six washers for a total of 17 washers.

As a result of this rearrangement of the washers in FIG. 7, the blade units are affected in two respects. First, there is a greater cant or slant to the right to form a greater rake angle. In this setting, the teeth have a more severe cutting action than in the setting of FIG. 5. Secondly, since there are fewer washers on each pin 24 and 25 than in the case of FIG. 5, there results a limited degree of lateral movement for the units 41 through 44. This limited movement serves in the same manner as the limited outward movement of the blade units, namely, to reduce appreciably mechanical shock when a blade strikes a hard object embedded in a tire to minimize the likelihood of breakage of blade teeth. Of course, still other settings are possible to increase or decrease the rake angle, or to allow more or less lateral movement of the units, all by judiciously selecting the number and position of the washers 40.

The present adjusting of the blade units not only affects their action within a given quadrant of the rasp head, but as well with respect to consecutive or contiguous quadrants. For example, in FIG. 1 the blade units generally indicated at 47 in the lower quadrant as there viewed slant to the left; while the blade units generally represented at 48 in the upper quadrant slant to the right. The other two quadrants can be similarly arranged. This construction provides a relatively severe crossbuff on a tire. When the head rotates, the effect of the reversing rake is that of the arbor 12 being axially reciprocated, although such is not actually the case.

Figure 8:
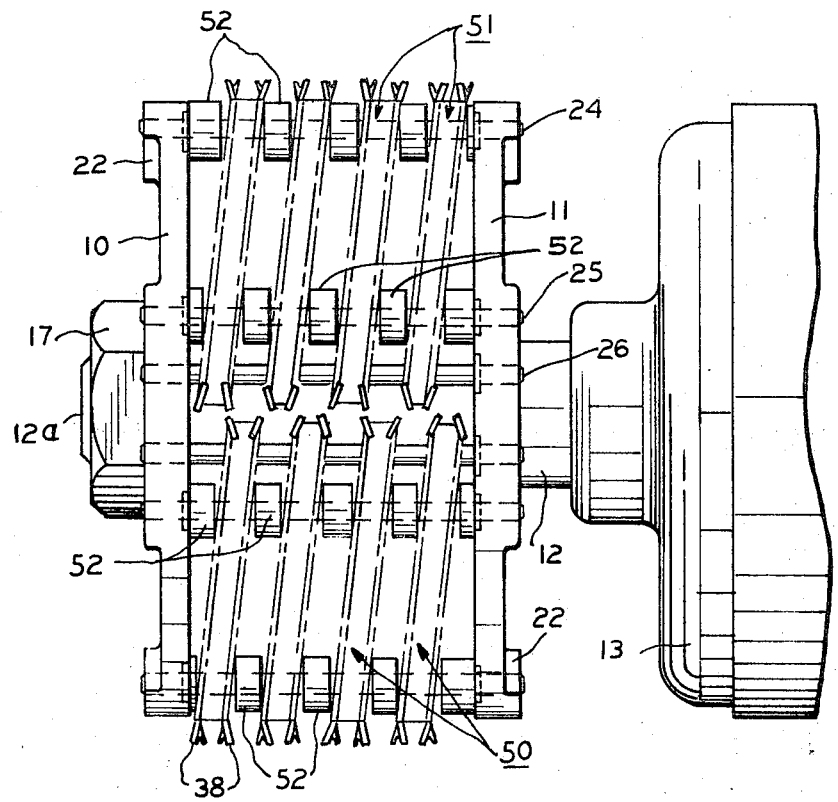
FIG. 8 is a side elevation of a rasp head similar to that of FIG. 1, and shows a disposition of the blade units of contiguous quadrants or segments of a rasp head that is preferred for some applications.

The embodiment of FIG. 8 shows another modification wherein the cutting teeth of consecutive quadrants of the rasp head are mounted in such manner as to cooperate in obtaining a desired type of buff. Certain parts of FIG. 8 are similar to the rasp head of FIG. 1, and therefore like numerals have been used to indicate like parts. In this embodiment, the objective is to achieve a relatively smooth buff free of undulations, that is, a "hill and valley" effect. To obtain this, the blade units of the lower quadrant, generally indicated at 50, are aligned with the spacings between the blade units of the upper quadrant, generally represented at 51, and vice versa. The other two quadrants may be similarly arranged. At high speed, the effect of a rasp head of FIG. 8 is to present a virtually continuous abrading surface to wear a tire evenly and uniformly. In FIG. 8, the central two pins 24 and 25 of the quadrant carry the spacers 51.

When the rake angle is fairly definite, as in the case of the embodiment of FIG. 8, the spacing means need not comprise a plurality of washers of relatively small width as shown, for example, in FIGS. 4 through 7. Instead, tubular spacers 52 having the desired width may be used. The spacers 52 may be fabricated from metallic or elastomeric materials.

The present rasp head may be easily disassembled by merely loosening the nut 17. The side plates 10 and 11 separate, one retaining those pins which are press-fitted therein. The rasp blades 31 easily slide off the mounting bars 30 and can be replaced if desired. Similarly, the bars 30 and washers 40 may be readily slipped off any of the pins and rearranged on the same or different pins if adjustment of the positions of the bars or washers is sought as to provide different angles of rake, different arrays of cutting units, etc., with the same blades. Thereafter the parts may be simply assembled in reverse order to that just described.

In operation, as the head rotates, the mounting bars 30 move outwardly of the pins 23 through 26 within the limit of the oversized openings 32 due to centrifugal force. Should the cutting teeth strike a hard object embedded in the tire, such as stones or glass, the blades 31 deflect inwardly and/or laterally where movement in that direction is also provided for as previously described. At the same time, scoops 20 direct air through openings 18 into the head and radially outwardly around the blades to cool the entire apparatus.

Althotugh the present invention has been described in conjunction with a double-bladed unit, it is understood that single blades can be used as well with the present head construction. For example, blades occupying a single plane may be mounted in the present head such as the blades disclosed in U.S. Pats. 3,102,325 to Hemmeter and 3,351,997 to Neilsen.

While the foregoing describes several embodiments of the present invention, it is understood that the invention may be practiced in still other forms within the scope of the following claims.

What is claimed is:

1. A rasp head construction comprising a drum member adaptable for rotation, a series of cutting blades, and means for mounting said blades with respect to the drum member, said mounting means comprising a plurality of generally juxtaposed, longitudinally extending mounting bars supporting said cutting blades, each mounting bar being carried by said drum member for limited, reversible, radial movement with respect to such member, whereby upon rotation of the drum member said mounting bars and blades flexibly assume an outward position under the influence of centrifugal force and can deflect inwardly therefrom to minimize breakage of said blades.

2. A rasp head construction comprising a drum member adaptable for rotation, a series of generally juxtaposed cutting blades mounted circumferentially of the drum member, and means for spacing apart the blades of said series, said means being adjustable in effective spacing distance and thereby adapted to vary the spacing between the units and/or the angular pitch of said blades with respect to their direction of movement.

3. The rasp head construction of claim 2 wherein the blades of said series are in substantial parallelism, and said spacing means is located adjacent the common ends of said blades.

4. The rasp head construction of claim 2 wherein said cutting blades are mounted on pins, and said spacing means comprises an adjustable number of washer members carried by the pins between said blades.

5. The rasp head construction of claim 2 wherein said drum member has openings adapted upon rotation of said member to direct a flow of ambient gas into said drum member and around said blades to cool them.

6. A rasp head construction comprising a drum member adaptable for rotation, cutting elements peripherally arranged on the drum member, and means for mounting the cutting elements with respect to the drum member, at least some cutting elements comprising a dual-bladed unit having a generally U-shaped cross-section curved in the direction of its length and defined by a bight portion and connecting upstanding leg portions, said bight portion spacing apart said leg portions, and said leg portions comprising elevating sections terminating in at least one cutting tooth.

7. The rasp head construction of claim 6 wherein said mounting means comprises a mounting member arcuately shaped in the idrection of its length and having mounting portions, and said dual-bladed unit has attaching means engaging said mounting portions for releasable attachment therewith.

8. The rasp head construction of claim 6 wherein said mounting means comprises a plurality of mounting strips arranged substantially side-by-side in an axial direction of said rotatable drum member, each strip having mounting flanges, and a dual-bladed unit is carried by each strip, each unit having tab portions slidably engaging the mounting flanges.

9. The rasp head construction of claim 6 wherein said drum member has circumferentially arranged segments of said cutting teeth, said mounting means for each segment comprises a plurality of mounting strips arranged substantially side-by-side in an axial direction of said rotatable drum member, and a dual-bladed unit is carried by each strip.

10. The rasp head construction of claim 9 wherein dual-bladed units of consecutive circumferential segments of said drum member are angled in opposite directions with respect to their direction of movement to provide a reverse rake cutting action.

11. The rasp head construction of claim 9 including means for spacing apart the dual-bladed units of each segment, and wherein the units of one segment are aligned with the spacings between the units of a contiguous segment.

12. The rasp head construction of claim 6 wherein said drum member comprises a pair of side plates held in spaced-apart relation, said mounting means comprises a series of pins extending from plate-to-plate and a mounting strip carried by the pins, and wherein said dual-bladed unit is detachably supported by said strip.

13. The rasp head construction of claim 12 wherein some of said pins are press-fitted with respect to one of said side plates, and the remaining pins are freely received in apertures of said side plates and have lock means to limit their axial movement.

14. The rasp head construction for removing rubber from the carcass of a tire, comprising: a pair of side plates held in spaced-apart relation and adapted for rotation about an axis passing through said plates, a series of pheripherally arranged buffing segments located between the side plates, each segment comprising support pins extending from plate-to-plate, a plurality of mounting strips arcuately shaped in the direction of their lengths carried by the pins substantially in side-by-side relation, and a dual-bladed unit having a generally U-shaped cross-section and curved in the direction of its length slidably engaging each mounting strip, each leg of each U-shape terminating in cutting teeth, said pins and strips being mounted in such manner as to permit limited outward or lateral movement of the U-shaped units, whereby upon rotation of the side plates said units flexibly assume an outward position under the influence of centrifugal force and can deflect inwardly and laterally therefrom to minimize breakage of said cutting teeth, and means carried by the pins for spacing apart the dual-bladed units of each buffing segment said means being adjustable in effective spacing distance and thereby adapted to vary the spacing between the units and/or the angular pitch of said blades with respect to their direction of movement.

15. The rasp head construction of claim 14 wherein said spacing means on said pins comprises a plurality of washer members adjustable as to number.

16. The rasp head construction of claim 14 wherein said side plates have air scoops adapted upon rotation of said side plates to direct a flow of ambient air between said plates and around said dual-bladed units to cool them.

References Cited

UNITED STATES PATENTS

| | | | |
|---|---|---|---|
| 1,549,855 | 8/1925 | Cote | 144—208 |
| 2,703,446 | 3/1955 | Jensen | 29—79 |
| 3,074,148 | 1/1963 | Hemmeter | 29—79 |
| 3,259,959 | 7/1966 | Tobey | 29—79 |
| 3,351,997 | 11/1967 | Neilsen | 29—79 |

HARRISON L. HINSON, Primary Examiner

U.S. Cl. X.R.

144—208